(12) United States Patent
Hafner

(10) Patent No.: US 6,254,104 B1
(45) Date of Patent: Jul. 3, 2001

(54) GASKET FOR AN AEROSOL VALVE STEM

(75) Inventor: Hans Hafner, Yonkers, NY (US)

(73) Assignee: Precision Valve Corporation, Yonkers, NY (US)

(*) Notice: Subject to any disclaimer, the term of this patent is extended or adjusted under 35 U.S.C. 154(b) by 0 days.

(21) Appl. No.: 09/300,541

(22) Filed: Apr. 27, 1999

(51) Int. Cl.⁷ .................................................. F16J 15/14
(52) U.S. Cl. ..................... 277/590; 277/650; 277/944; 222/402.16
(58) Field of Search .................... 277/590, 549, 277/627, 650, 944; 222/402.16, 402.2, 402.24, 402.17

(56) References Cited

U.S. PATENT DOCUMENTS

| | | | |
|---|---|---|---|
| 3,556,357 | * | 1/1971 | Graham et al. . |
| 3,795,350 | * | 3/1974 | Shay ........................... 222/402.24 X |
| 3,837,660 | * | 9/1974 | Poggio . |
| 3,845,887 | * | 11/1974 | Meuresch et al. . |
| 3,866,804 | * | 2/1975 | Stevens ........................... 222/402.17 |
| 4,015,752 | * | 4/1977 | Meuresch et al. . |
| 4,015,757 | * | 4/1977 | Meuresch et al. . |
| 4,135,648 | * | 1/1979 | White ............................... 222/402.2 |
| 4,240,467 | * | 12/1980 | Blatt et al. . |
| 4,243,235 | * | 1/1981 | Repella . |
| 5,842,701 | * | 12/1998 | Cawthorne et al. . |

* cited by examiner

Primary Examiner—Lynne H. Browne
Assistant Examiner—William L. Miller
(74) Attorney, Agent, or Firm—Kilgannon & Steidl

(57) ABSTRACT

An improved valve stem gasket comprising a flat-shaped gasket with a central aperture wherein the durometer of the gasket varies from a relatively low hardness value in the inner portion of the gasket extending radially outward from the central aperture to a relatively higher hardness value at the radially outer portion of the gasket whereat the gasket will be contacted by the upper wall portion of the valve housing. In a preferred form of the gasket, the variation in durometer value will be gradually varied from the inner portion of the gasket to the radially outer portion of the gasket.

14 Claims, 2 Drawing Sheets

GASKET FOR AN AEROSOL VALVE STEM

This invention generally relates to a gasket for sealing the valve stem orifices of an aerosol valve.

BACKGROUND OF THE INVENTION

Aerosol containers are widely used to package a variety of fluid materials, both liquid and powdered particulate products. Typically, the product and a propellant are confined within the container, at above atmospheric pressure, and the product is released from the container by manually opening a dispensing valve to cause the pressure within the container to deliver the product through the valve and connecting conduits to a discharge orifice.

The dispensing valve, crimped to a mounting cup having a sealing gasket, is normally mounted in a top opening of the container, which opening is defined by a component commonly referred to as the "bead" of the container opening. The mounting cup includes a central pedestal portion for holding the dispensing valve, a profile portion extending outward from the pedestal portion, which profile portion merges into an upwardly extending body portion, the body portion emerging into a hemispherically-shaped channel portion terminating in a skirt portion, which channel portion is configured to receive the bead portion of the container opening. The sealing gasket normally is disposed within the channel portion and in many gasket configurations extends downward along a part of the body portion. After the sealing gasket is disposed onto the mounting cup, the cup is positioned onto the container and the cup is clinched to the container. The clinching operation is well-known to those skilled in the aerosol container art.

The aerosol dispensing valve generally comprises a hollow valve stem having an integral wider base portion, generally referred to as the valve stem body, positioned intermediate between the valve stem and valve stem body is a valve stem groove. A valve housing surrounds the valve stem body, and is crimped and held within the pedestal portion of the mounting cup. A spring is disposed between the bottom of the valve housing and the underside of the valve stem body, and, in many instances, a hollow tube (dip tube) extends from the outside base of the valve housing to the bottom of an associated aerosol container.

The valve stem groove has one or more opening(s) or orifice(s) extending through the valve stem groove wall. An annular valve sealing gasket with a central opening for receiving the valve stem is positioned in the annular valve stem groove, with the orifice(s) within the groove being positioned above the lower surface of the valve gasket when the valve is in the closed position. When the valve is opened by depressing or tilting the valve stem, the valve stem moves axially downwardly or tilts from its upright position to cause the orifice(s) in the annular valve stem groove to move out of registry or sealing relation with the gasket. Product in the aerosol container then, under the influence of the pressure generated by the propellant, passes upwardly through the dip tube into the valve housing, then through the orifice(s) in the annular valve stem groove into the hollow valve stem, and outwardly through an outlet nozzle in an actuator button, cup or spout mounted atop the valve stem.

In an aerosol valve, an effective seal between the valve stem groove and the annular gasket surrounding the groove is critical. Additionally, in an aerosol valve, a further critical seal is the seal between the same annular gasket sealing against the valve stem and the underside of the top portion of the pedestal of the mounting cup and annular upper terminus of the valve housing.

Heretofore, while meeting with significant commercial success, annular gaskets for sealing against the valve stem have comprised a rubber ring having a central opening and a flat, disc-shaped radial portion extending circumferentially from the central opening, which gaskets are die cut from a flat sheet or by cutting from rubber tubing. The aforesaid gaskets of the prior art have been gaskets having a uniform durometer, the most popular compositions being neoprene and buna nitrile rubber having 72 and 55 durometer (Shore A). While acknowledging the success of the prior art valve stem gaskets, there are still a significant number of rejected valves due to a defective sealing between the valve stem gasket and the dual sealing surfaces of said gasket, namely, the seal between the inner portion, including the surface defining the central opening in the gasket, and the valve stem groove and the top and bottom outer portion of the gasket against the underside of the top surface of the pedestal portion of the mounting cup and terminal upper wall portion of the valve housing, respectively.

It is now recognized that the nature of a single durometer gasket contributes to the leaking problem. With a single durometer gasket, there is a compromise in the selection of the single durometer gasket to satisfy the different needs of durometer hardness at the two areas of sealing discussed above, the consequence being that the gasket durometer which would yield the maximum sealing properties at each area is not utilized.

SUMMARY OF THE INVENTION

An object of this invention is to provide a valve stem gasket with improved sealing characteristics.

The improved valve stem gasket of this invention comprises a flat disc-shaped gasket with a central aperture wherein the durometer of the gasket varies from a relatively low hardness value in the inner portion of the gasket extending radially outward from the central aperture to a relatively higher hardness value at the radially outer portion of the gasket whereat the gasket will be contacted by an upper wall portion of the valve housing. In a preferred form of the gasket, the variation in durometer value will be varied from the inner portion of the gasket to the radially outer portion of the gasket. In a still more preferred form and where the gasket of this invention will be used with a valve housing having a castellated upper outside wall, the perimetal portion of the gasket beyond the portion of the gasket whereat the underside of the gasket is crimped by an upwardly extending housing wall inwardly disposed from the outer castellated housing wall, has a lower durometer value than the gasket at the crimp point of the upwardly extending wall and underside of the gasket.

IN THE DRAWINGS

DETAILED DESCRIPTION OF EMBODIMENT

Figure 1:
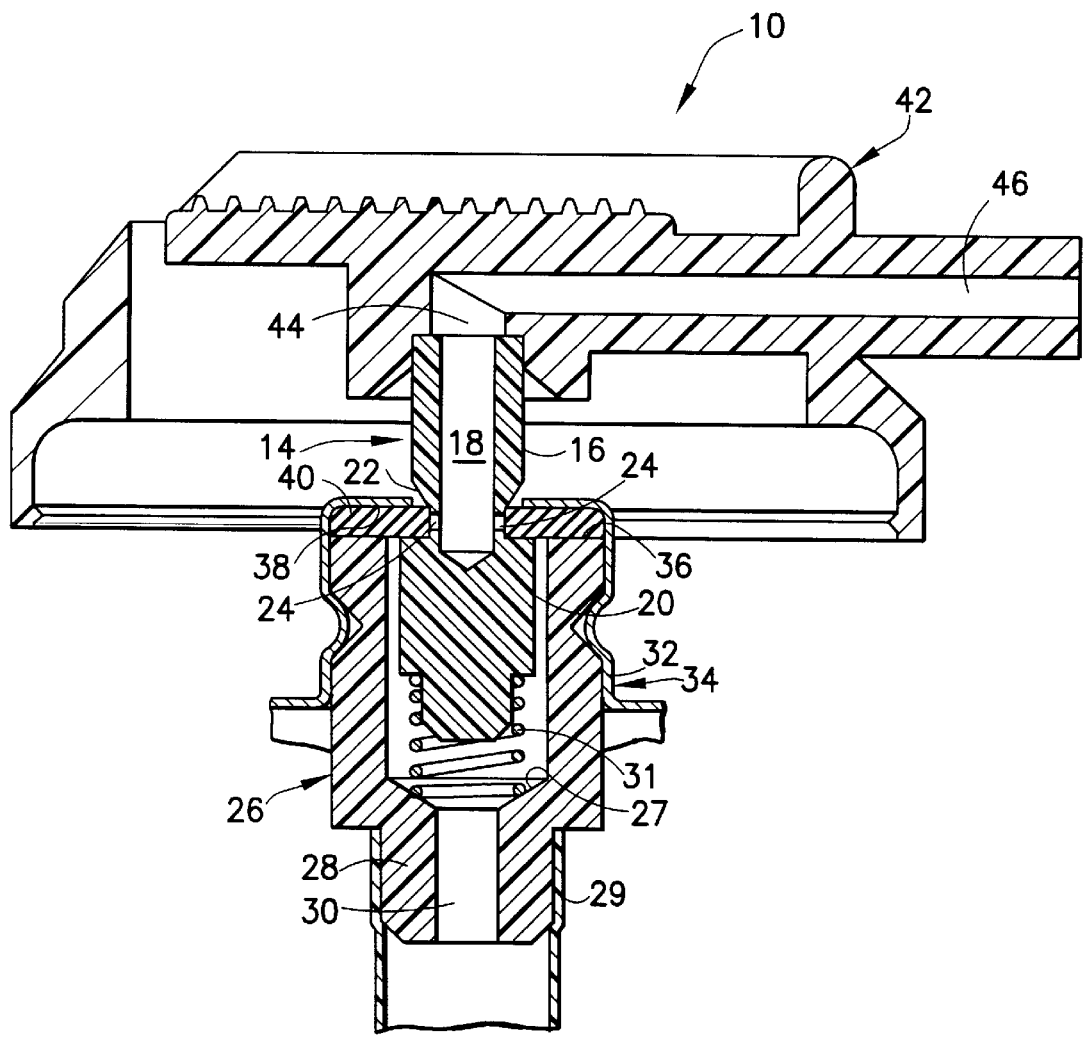
FIG. 1 is a cross-section view of a conventional aerosol valve of the prior art in closed position.
Figure 2:
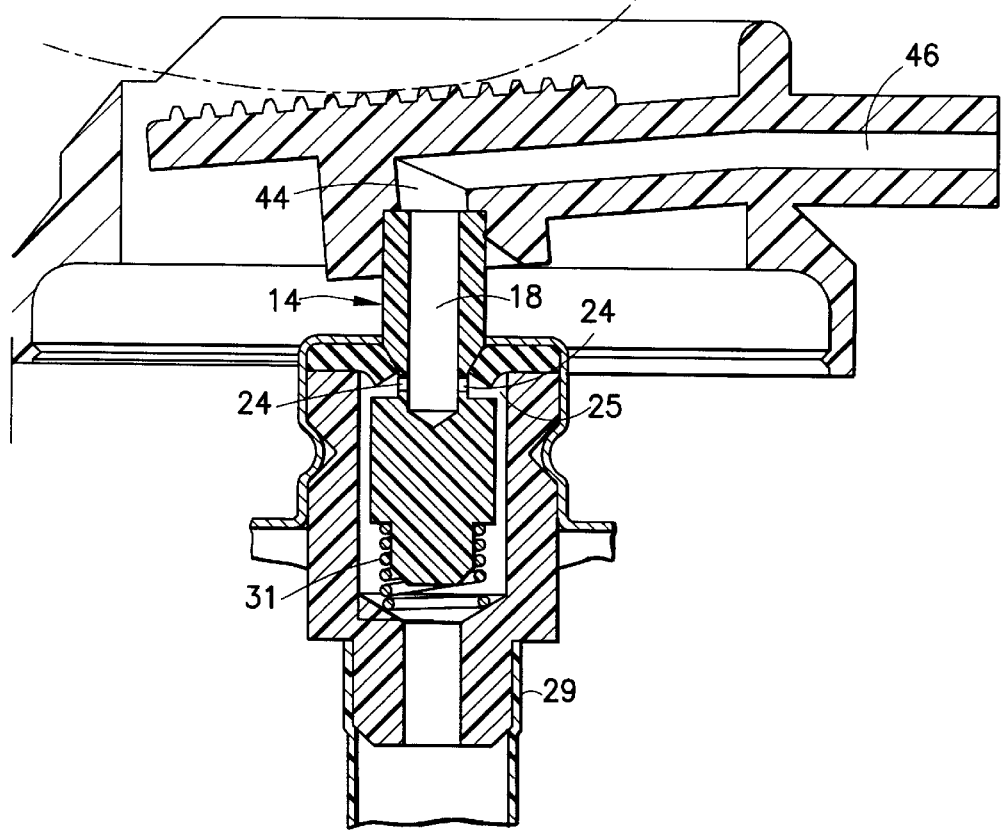
FIG. 2 is a cross-section view of a conventional aerosol valve of the prior art in an open position.

FIG. 1 illustrates an aerosol valve assembly generally shown at 10. More specifically, the valve assembly includes a valve stem/valve stem body, generally designated as 14, said valve stem/valve stem body having an upper valve stem portion 16 with the conduit 18 therethrough; a valve stem body portion 20 and an annular groove portion 22 intermediate between the upper valve stem portion 16 and the valve stem body portion 20; said groove portion having orifices 24 through the wall of the groove portion and interconnecting with the conduit 18. Surrounding the valve stem body 20 is a valve housing 26, said valve housing having an extending nipple 28 with a conduit 30 therethrough, the nipple 28 being designed to receive a dip tube 29 (shown in partial section). The valve housing 26 is crimped within the pedestal portion 32 of a mounting cup 34 (shown in partial section). Disposed atop the upper wall 36 of the valve housing 26 and the underside 38 of the pedestal portion 32 is an annular gasket 40 which is disposed within the groove portion 22 in sealing relation with the orifice(s) 24 when the valve is in the closed position as shown in FIG. 2. Disposed atop the valve stem 16 is an actuator 42 having a conduit 44 therethrough and terminating in the discharge orifice 46. Disposed between the valve stem body 20 and the base 27 of the valve housing 26 is a spring 31.

FIG. 2 illustrates the aerosol valve assembly in an open position. With the valve in the open position due to applying downward force on the actuator, product and propellant in the aerosol container will travel through the dip tube 29 into the interior of the valve housing 25 to the orifices 24, into the conduit 18 of the valve stem and then through the conduit in the actuator 44 and ultimately to the discharge nozzle 46. Releasing the downward force on the actuator 44 will result in returning the valve stem/valve stem body 14 to its sealed position through the upwardly directed force of the spring 31. All of the foregoing is conventional in the aerosol valve art.

Figure 3:
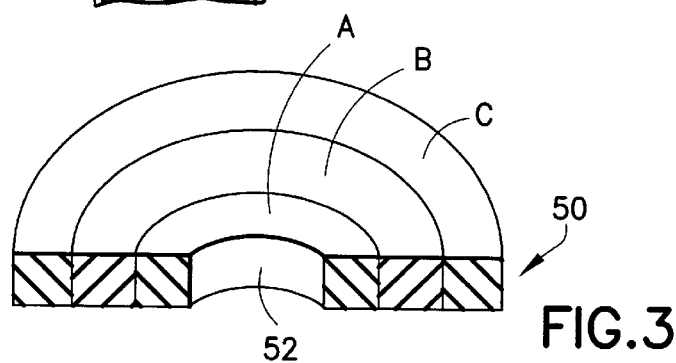
FIG. 3 is an enlarged cross-section of the valve stem gasket of this invention.

The invention concerns substituting for the valve stem gasket of the prior art an improved gasket 50, an embodiment of which is shown in FIG. 3.

In FIG. 3, the gasket, generally designated as 50, has a central aperture 52 and three zones of varying durometer, namely, zones A, B and C. The inner zone A (zone nearest to aperture 52) has the lowest durometer. Contiguous to inner zone A is zone B, which has a higher durometer. Zone C, the outer portion of the gasket 50 has the highest durometer.

A typical, conventional aerosol gasket has an:

(a) outside diameter of 0.355";

(b) central aperture having a diameter of 0.100";

(c) thickness of 0.045".

The gasket may be formed of any elastomeric materials, examples of which are shown in Table 1 below. The zones of varying durometer may all be composed of the same material or may each be composed of a different type of elastomeric material or any combination of the foregoing. A type of nitrile rubber commonly referred to as Buna N is widely used for aerosol gaskets. An improved gasket can be made by forming the gasket out of Buna N rubber with durometers of 50–60, 63–73 and 75–85, Shore A, in zones A, B and C, respectively. However, the preferred construction of an improved gasket utilizes a TPR from the TPV category. In this case, a TPV material having a finely divided EPDM rubber for the elastomer phase, dispersed in a continuous polypropylene matrix, is used. The durometer of this material should be 50–60, 63–73 and 75–85, Shore A, in zones A, B & C respectively.

TABLE 1

Types of Elastomers

| Common Name | Chemical Name |
| --- | --- |
| Conventional/Thermoset rubber categories: | |
| Natural Rubber | polyisoprene |
| Butyl Rubber | polyisobutylene-isoprene |
| Nitrile Rubber | acrylonitrile-butadiene |
| EPDM Rubber | Copolymer terpolymer of ethylene, propylene and a diene monomer |
| Neoprene Rubber | polychloroprene |
| TPR/Thermoplastic rubber categories: | |
| Thermoplastic copolyesters (COP) | |
| Thermoplastic elastomeric olefins (TEO) | |
| Thermoplastic vulcanizates (TPV) | |
| Thermoplastic styrene block copolymers | |

The above indicated Thermoset rubbers must all be cured by the addition of sulfur or hydrogen peroxide or cured by irradiation; these procedures being well known to those skilled in the art of preparing gasket material.

The variable durometer gasket of this invention may be manufactured by conventional coextrusion equipment. For example, to prepare the variable durometer of FIG. 3, a tubular member having three materials of varying durometer are simultaneously co-extruded. Subsequently, the individual gaskets are formed by die cutting the tubular member into the desired thickness.

Also throughout the specification and claims, reference to Shore A is to the test protocol set forth as ASTM Designation: D-2240-91.

It is believed that the improvement of this invention will result if the durometer is varied between 45–85 Shore A. It should be understood that while a three zoned variable durometer gasket is the preferred form, a two zoned and four or more zones are also contemplated by the subject invention. Critical to the invention is that the zone nearest the central aperture of the gasket be of a lower durometer than the radially outward zone whereat crimping of the upper wall of the valve housing and the underside of the gasket takes place.

In another embodiment of the gasket of this invention, the low durometer portion of the gasket may extend from the central opening of the gasket to the portion of the gasket whereat the valve housing wall crimps into and contacts the underside of the gasket, whereat the durometer hardness is increased for some or all of the zone of contact between the valve housing wall and the underside of the gasket.

As noted earlier, in the instance where the outer valve housing wall is castellated, it is a preferred embodiment to use a gasket having a lower durometer such as at the inner zone of the gasket, or a still lower durometer. Such a valve housing is shown and described in U.S. Pat. No. 4,015,752 ('752) at FIG. 2 and the related text material of the '752 patent and U.S. Pat. No. 4,015,757 ('757) at FIG. 3 and the related text material of the '757 patent, which portions of the noted United States patents are incorporated by reference.

It has been discovered in general that lower durometer gaskets provide better sealing at the orifices in the annular valve stem groove but that said lower durometer gasket has poorer mechanical properties, e.g., tensile strength, compression set, creep/cold flow, and greater swelling. Higher durometer gaskets of the same material, in general, have poorer sealing qualities (relative to low durometer gaskets), but have better mechanical properties and less swelling. Higher durometer gaskets form a more stable assembly in the area of the crimp of the valve to the mounting cup. Low durometer gaskets may develop leak paths in the crimp area due to compression set and creep/cold flow. Also, greater swelling in the low durometer gaskets may result in poor performance of the valve from the standpoint of the degree of force needed to actuate the valve or in extreme cases a failure to actuate. Finally, increasing the durometer across the radially extending surface of the gasket reduces the permeation of propellant through the gasket.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

I claim:

1. In an aerosol valve having a hollow valve stem, a valve stem body, a valve housing surrounding the valve stem body, an intermediate portion between the valve stem and the valve stem body having at least one orifice communicating the interior of the hollow valve stem and the interior of the valve housing and a valve stem gasket having a central aperture encircling and sealing all orifices in the intermediate portion, the intermediate portion being capable of moving to expose at least one orifice in the intermediate portion from contact with the valve stem casket and thereby open the valve, the improvement comprising the valve stem gasket having plural zones of varying durometer, the zone nearest the central aperture and sealing against the orifice in the intermediate portion having a lower durometer relative to the durometer of the zone further radially outward from the aperture.

2. The improvement of claim 1, and further wherein the plural zones comprise a first zone nearest the central aperture having a relatively low durometer, an intermediate zone radially outward from the first zone having a relatively higher durometer than the durometer of the first zone and an outer zone radially outward from the intermediate zone having a durometer relatively higher than the intermediate zone.

3. The improvement of claim 2, and further wherein the first zone of the plural-zoned gasket has a durometer between 45 to 65 Shore A, the intermediate zone has a durometer between 60 to 75 Shore A and the outer zone has a durometer between 70 to 85 Shore A, provided further that each succeeding zone extending radially outward has a greater durometer.

4. The improvement of claim 1, and further wherein the plural-zoned gasket has a varying durometer of four or more zones with a first zone nearest the central aperture having a relatively low durometer and each successive zone extending radially outward having a relatively higher durometer.

5. The improvement of claim 4, and further wherein the varying durometer for the zones is between 45 to 85 Shore A.

6. The improvement of claim 1, and further wherein the zone nearest the central aperture of the plural-zoned gasket has a durometer between 45 to 65 Shore A, and a zone further radially outward of the zone nearest the central aperture has a durometer between 70 to 85 Shore A.

7. In an aerosol valve having a hollow valve stem, a valve stem body, a valve housing having a top wall and shoulder surrounding the valve stem body, an intermediate portion between the valve stem and the valve stem body having at least one orifice communicating the interior of the hollow valve stem and the interior of the valve housing, a valve stem gasket having a top and underside and having a central aperture encircling and sealing all orifices in the intermediate portion, a mounting cup having a pedestal portion in which the valve housing is crimped so as to create a seal between the underside of the gasket and a shoulder of the valve housing, the improvement comprising the valve stem gasket having plural zones of varying durometer, the zone nearest the central aperture having a relatively low durometer and the zone in the area where the shoulder of the housing is crimped to create a seal between the underside of the gasket and the top wall of the housing has a greater durometer than the zone nearest the central aperture.

8. The improvement of claim 7, and further wherein the plural zones comprise a first zone nearest the central aperture having a relatively low durometer, an intermediate zone radially outward from the first zone having a relatively higher durometer than the durometer of the first zone and an outer zone radially outward from the intermediate zone having a durometer relatively higher than the intermediate zone.

9. The improvement of claim 8, and further wherein the first zone has a durometer between 45 to 65 Shore A, the intermediate zone has a durometer between 60 to 75 Shore A and the outer zone has a durometer between 70 to 85 Shore A, provided further that each succeeding zone extending radially outward has a greater durometer.

10. The improvement of claim 7, and further wherein the plural-zoned gasket has four or more zones with a first zone nearest the central aperture having a relatively low durometer and each successive zone extending radially outward having a relatively higher durometer.

11. The improvement of claim 10, and further wherein the varying durometer for the zones is between 45 to 85 Shore A.

12. The improvement of claim 7, and further wherein the zone nearest the central aperture of the plural-zoned gasket has a durometer between 45 to 65 Shore A, and a further outward zone in the area where the shoulder of the housing is crimped to create a seal between the underside of the gasket and the top wall of the housing has a durometer between 70 to 85 Shore A.

13. The improvement of claim 7, and further wherein the valve housing has an annular castellated outer wall and an annular upstanding member disposed radially inward of the outer wall which is crimped into the underside of the valve stem gasket and the portion of the gasket extending perimetally of the crimp between the shoulder of the housing and the underside of the gasket has a durometer value less than the durometer value at the crimp.

14. The improvement of claim 13, and further wherein the durometer value of the gasket extending perimetally of the crimp has the same or a lower durometer value than the durometer value at the portion of the gasket nearest the central opening of the gasket.

* * * * *